March 31, 1964  F. H. OSBORNE ETAL  3,127,178
TAPE PLAYING MACHINE
Filed June 29, 1960  10 Sheets-Sheet 2

INVENTORS
BY: Fred H. Osborne
Howard M. Thomas
Olson & Trexler  attys

INVENTORS
Fred H. Osborne
Howard M. Thomas
BY Olson & Trexler
attys

March 31, 1964  F. H. OSBORNE ETAL  3,127,178
TAPE PLAYING MACHINE

Filed June 29, 1960  10 Sheets-Sheet 9

INVENTORS.
Fred H. Osborne
BY Howard M. Thomas
Olson & Trexler
attys.

United States Patent Office 3,127,178
Patented Mar. 31, 1964

3,127,178
TAPE PLAYING MACHINE
Fred H. Osborne, Snyder, and Howard M. Thomas, North Tonawanda, N.Y., assignors to The Wurlitzer Company, Chicago, Ill., a corporation of Ohio
Filed June 29, 1960, Ser. No. 39,493
9 Claims. (Cl. 274—11)

The present invention relates to tape playing machines, particularly machines for playing magnetic tape.

One object is to provide a new and improved tape playing machine which will receive a plurality of tapes at once and respond to simple control signals or movements automatically to play any desired selection of the tapes.

Another object is to provide a new and improved tape playing machine which will operate, when loaded with a plurality of tapes, to play the individual tapes for unlimited periods of time selectively in a manner which provides through operation of the machine for replacement of the tape being played by any other tape in the machine.

Another object is to provide a new and improved tape playing machine which will hold a plurality of recording tape cartridges at once and operate under its own power to play any desired selection of the tapes in the individual cartridges for any desired length of time.

Another object of the invention is to provide, for playing a plurality of individual tapes selectively, a new and improved tape playing machine which will receive a plurality of tapes at once and operate in response to rotary movement of a transfer element to place any desired one of the tapes in playing position in relation to a tape deck and to replace the tape in playing position with any other desired one of the tapes in the machine.

A further object is to provide a new and improved tape playing machine which is operated and electrically controlled in a manner which not only enables the machine to operate automatically under its own power to play selectively a number of tapes stored in the machine, but which also provides for a highly advantageous simplification of the construction and operation of mechanical structure used in the machine.

A further object is to provide, for playing selectively a plurality of tapes encased in individual cartridges for playing, a new and improved tape playing machine of the character recited in the preceding objects which supports a plurality of tape cartridges simultaneously in readiness for playing in a manner that provides for very easy removal of individual cartridges from the machine and equally easy mounting of other cartridges in the machine.

Other objects and advantages will become apparent from the following description of the exemplary embodiment of the invention illustrated in the drawings, in which.

Referring to the drawings in greater detail, the tape playing machine 30 forming the exemplary embodiment of the invention illustrated in the drawings is particularly well adapted, as will presently appear, for use in a background music system to supply a continuous program of music from recordings on tape. The supplying of background music in places of amusement, stores, factories, and in many other environments, has proven to be quite advantageous and desirable in many instances. To maximize the benefits of such background music it is desirable to change the musical program from time to time to vary the type and tempo of music being played. Thus, after a program of semi-classical music, for example, has been playing for some time, it may be desirable to substitute and continue with a program of popular music, jazz, or music of some other distinct type.

As will be described presently in detail, the machine 30 is designed to receive a plurality of individual tapes, in this instance four, and operates unattended under its own power to supply from any one tape a virtually continuous musical program, while at the same time being responsive to simple command signals or control movements to automatically replace the tape being played with any one of the tapes in the machine to continue the musical program.

In broad outline, the tape playing machine 30 comprises an automatic tape deck 32 centrally located within the machine and adapted, as will presently appear, to provide a virtually uninterrupted program from a single tape which is cyclically reversed in its direction of movement and played continuously as it moves in opposite directions through the tape deck. Moreover, the tape deck 32 is designed to play tapes substantially encased in individual tape holding and playing cartridges 34, FIGS. 1 and 17.

Figure 1:
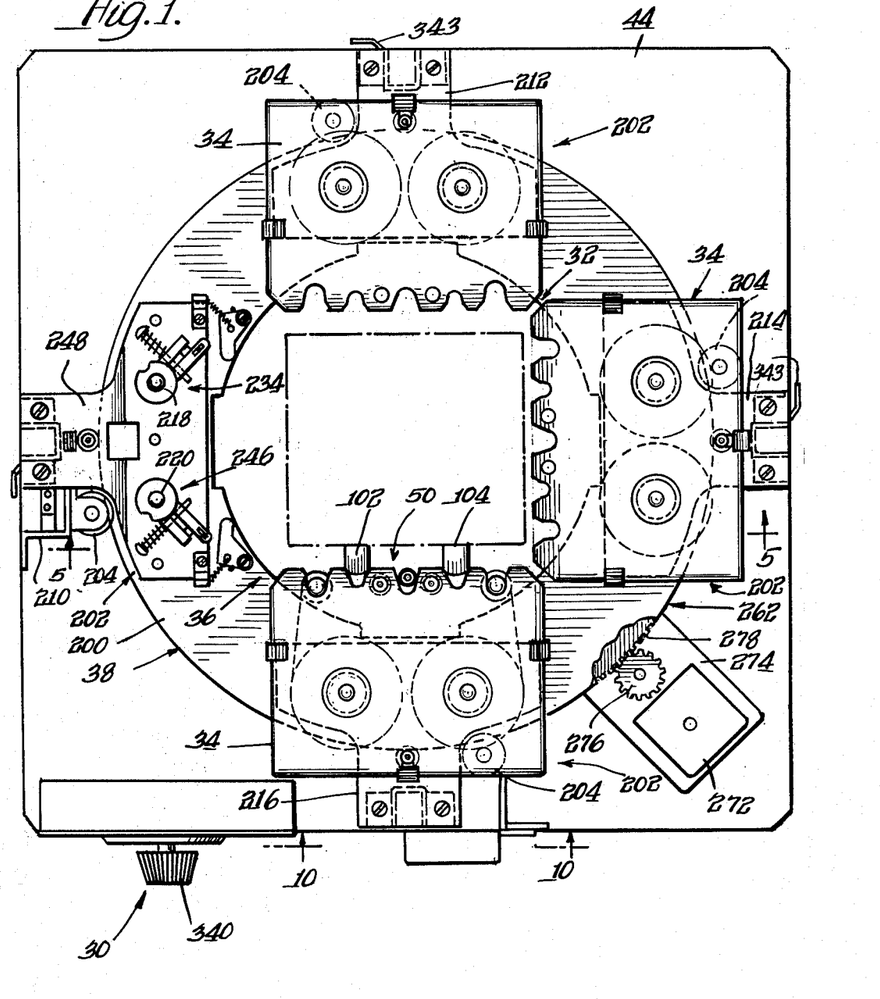
FIGURE 1 is a plan view of a tape playing machine forming the exemplary embodiment of the invention to be described.
Figure 7:
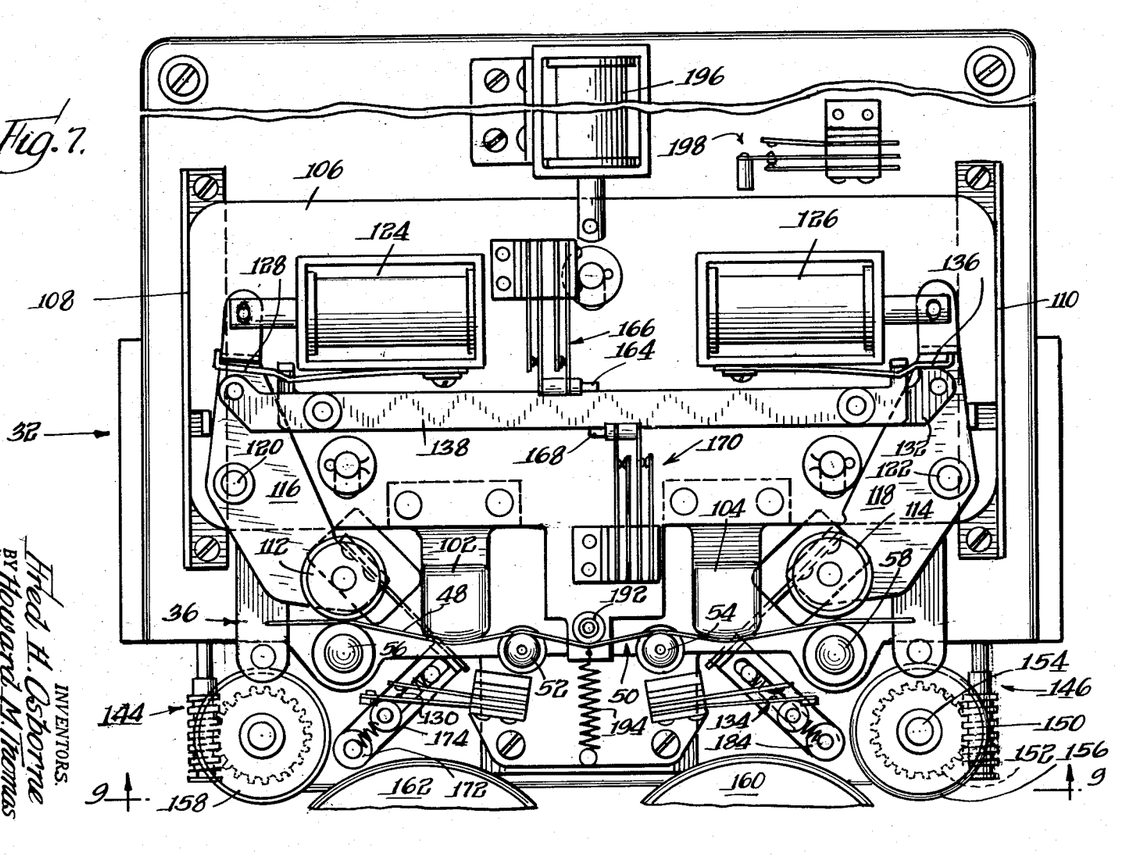
FIG. 7 is a plan view on an enlarged scale of the automatic tape deck assembly centrally located within the machine.
Figure 8:
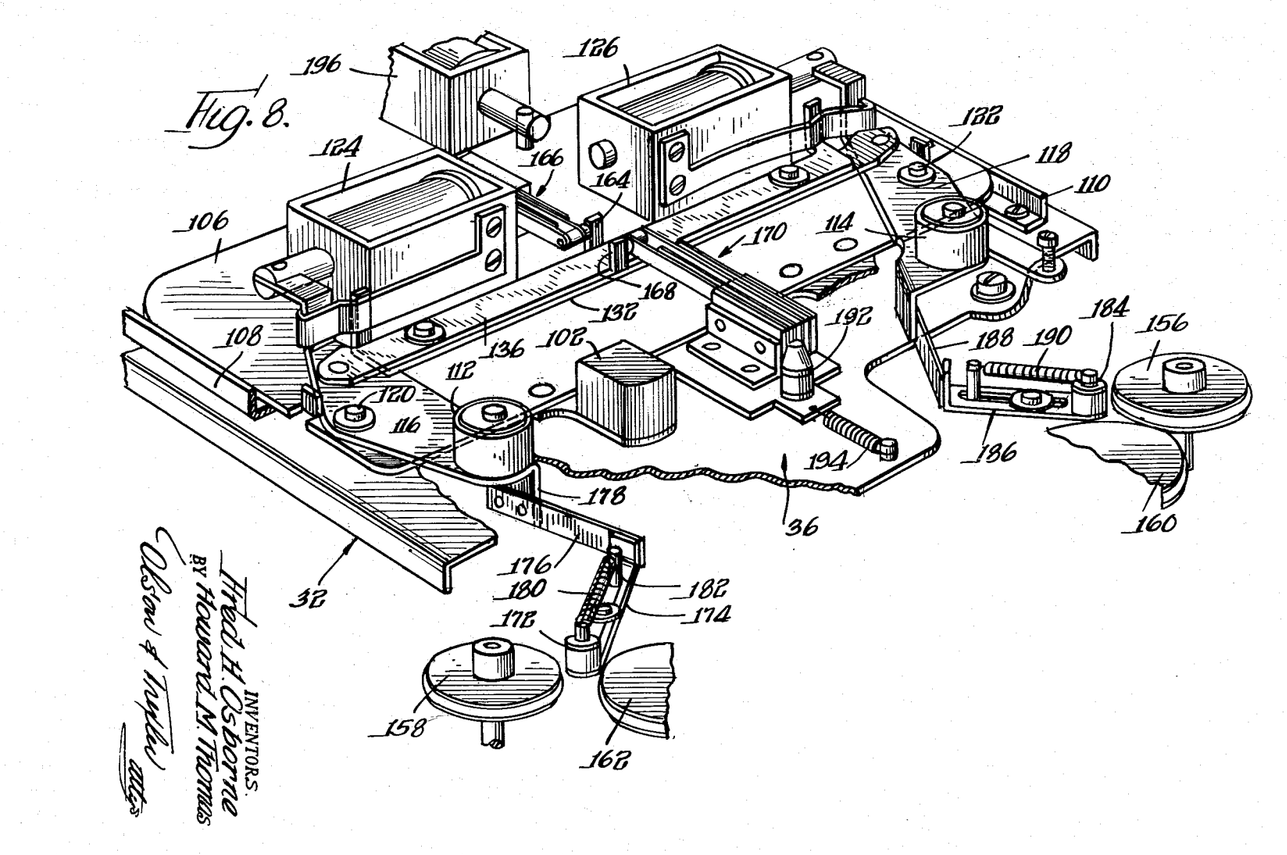
FIG. 8 is a perspective view of the upper portion of the tape deck appearing in FIG. 7.

The tape deck 32 defines a single tape playing station identified generally by the number 36, FIGS. 1, 7, and 8, in which individual tapes to be played are placed by operation of the machine 30 in response to simple command signals. As previously intimated, the tape deck 32 operates automatically to play a tape in the station 36 continuously substantially without interruption of the program played from the tape.

Normally, the machine is loaded with a plurality of tape cartridges 34, in this instance four, demountably supported on a rotatable tape carriage 38 which is operated by the machine to place any one of the cartridges 34 in the tape playing station 36 and to replace any cartridge in the playing station with any other cartridge on the carriage.

A full understanding of the operation of the machine can be more easily obtained with reference to the ensuing description of the construction of the machine which for convenience in presentation will be divided under a number of headings.

The Automatic Tape Deck

Figure 5:
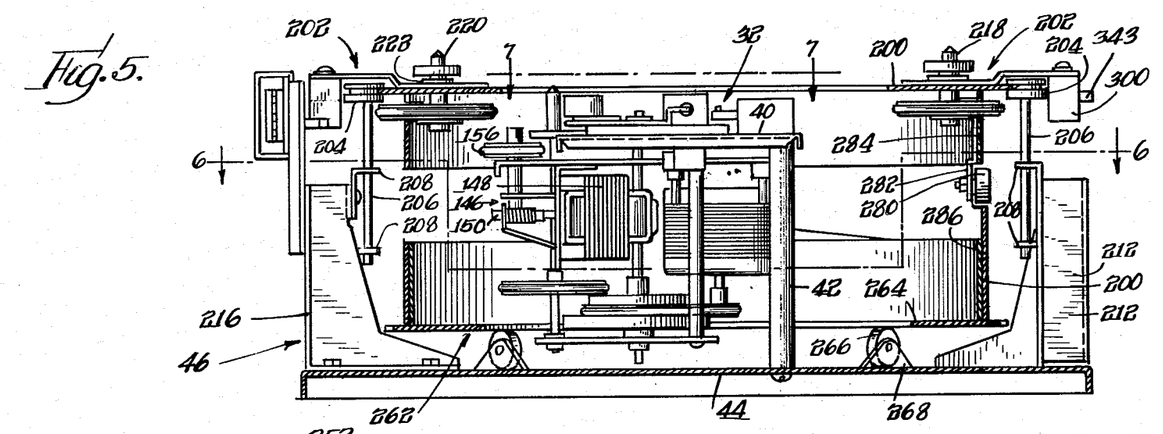
FIG. 5 is a transverse sectional view taken generally along the line 5—5 of FIG. 1.
Figure 9:
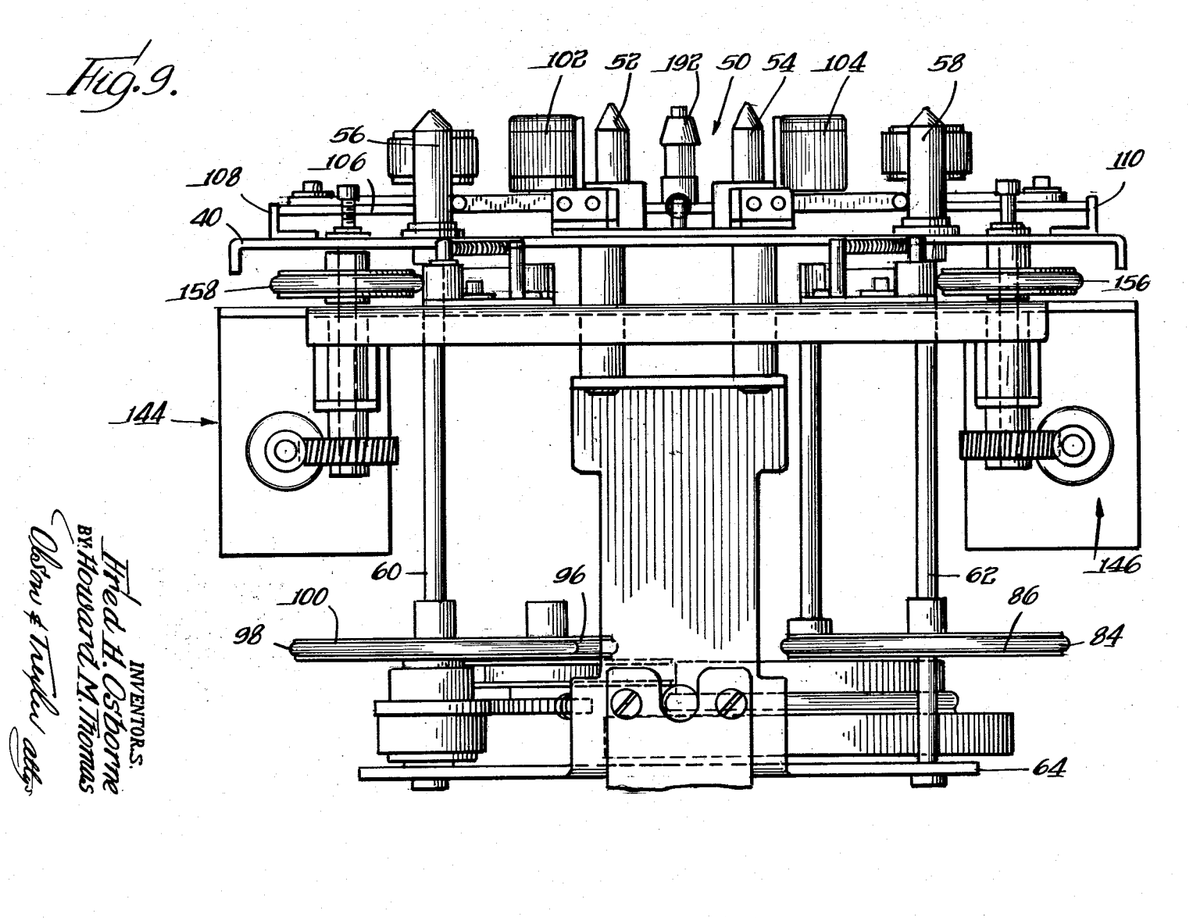
FIG. 9 is a fragmentary, vertical sectional view on an enlarged scale taken along the line 9—9 of FIG. 7.

Centrally located within the machine 30, the tape deck 32 is mounted on a central horizontal plate 40, FIGS. 5 and 9, supported by a plurality of standards 42 on a horizontal bottom plate 44 of the support frame 46 of the machine. The tape to be played, designated in the drawings by the number 48, FIG. 7, is directed through a tape playing path defined on the tape deck 32 and identified generally by the number 50. As will be explained presently, the carriage 38 has an annular or generally circular shape. The positional relationship of the tape playing path 50 defined by the tape deck 32 to the circular carriage 38 is that of a chord of a circle to the circle. Two cylindrical studs or taps supports 52, 54 fixed to the mounting plate 40 of the tape deck project upwardly alongside the tape path 50, as shown in FIGS. 7 and 9. The supports 52, 54 are located on the carriage side of the tape path and support the tape in the path against movement toward the carriage, as will presently appear.

Tape is moved in opposite directions through the path 50 by means of two rotary tape driving elements or capstans 56, 58, journaled in the mounting plate 40 and projecting upwardly alongside the carriage side of the tape path 50, as shown in FIGS. 7 and 9. The driving elements 56, 58 are spaced substantial distances beyond the respective tape supports 52, 54 which are spaced from each other, as shown.

During operation of the tape deck 32, the two driving elements or rollers 56, 58 are continuously rotated in opposite directions by two driving shafts 60, 62 extending downwardly from the respective roller elements, as shown in FIG. 9, and journaled at their lower ends in a lower mounting plate 64 supported in depending relation to the upper mounting plate 40, as shown.

Figure 6:
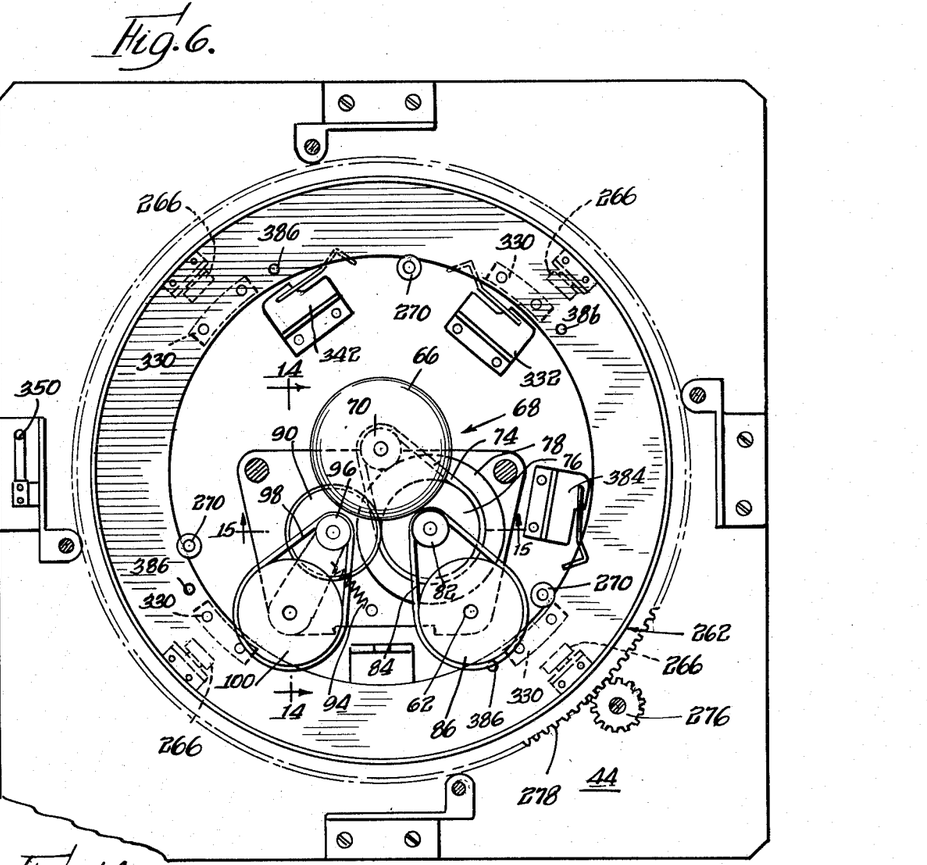
FIG. 6 is a horizontal sectional view taken with reference to the irregular line 6—6 in FIG. 5.

A tape driving motor 66 is connected through a belted transmission 68, FIG. 6, to rotate the respective tape driving elements 56, 58 at a uniform speed which provides a peripheral or surface speed of each element equal to the speed, in this instance three and three-fourths inches per second, which tape is to be moved through the path 50 for playing.

Figure 4:
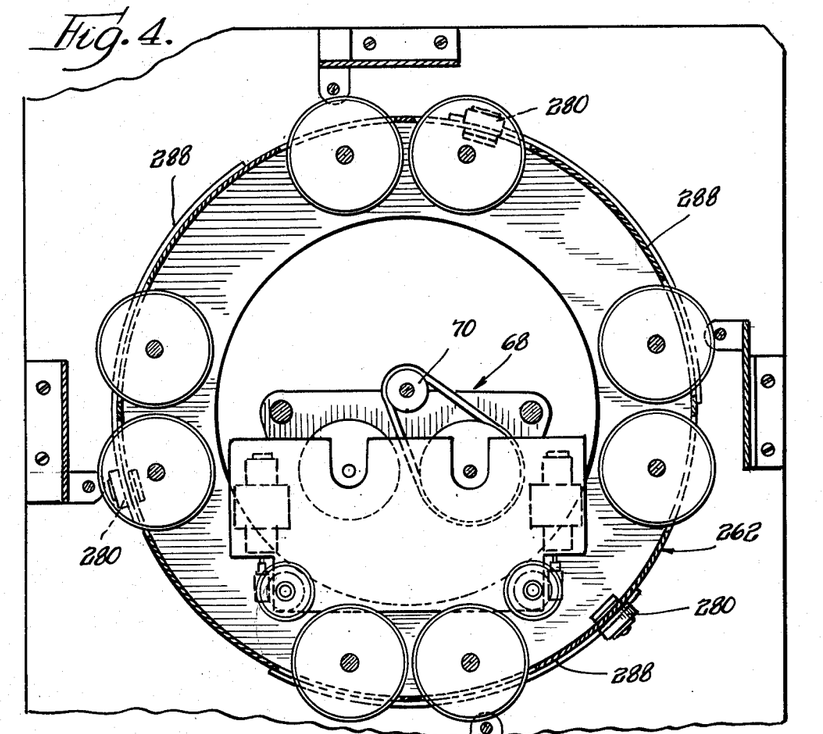
FIG. 4 is a horizontal sectional view taken generally along the line 4—4 of FIG. 3.

Preferably the tape driving transmission 68 comprises a relatively small pulley 70, FIG. 4, mounted on the downwardly projecting end of the shaft 72 of the motor 66, which is supported on the underside of the mounting plate 40, as shown. A belt 74 connects the pulley 70 to a larger pulley 76, FIGS. 6 and 15, integrally formed on an inertia fly wheel 78 journaled on a shaft 80 supported between the mounting plates 40 and 64.

The pulley 76 is much larger than the driving pulley 70 and rotates at a greatly reduced speed. A second relatively small pulley 82 formed integrally with the relatively large pulley 76 and vertically spaced above the latter pulley, as shown in FIG. 15, is connected by a belt 84 with a larger pulley 86 nonrotatably mounted on the shaft 62 which rotates the tape driving element 58.

Figures 14, 15:
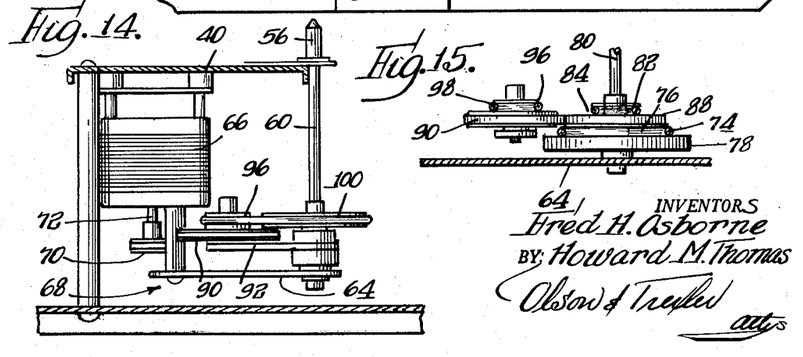
FIG. 14 is a fragmentary vertical sectional view taken along the line 14—14 of FIG. 6.
FIG. 15 is a fragmentary sectional view taken along the line 15—15 of FIG. 6.

A friction wheel 88 integrally formed on the pulley 76 between the latter and the pulley 82, as shown in FIG. 15, is engaged by a rubber tired friction wheel 90 of equal diameter, FIG. 6, swingably supported on an arm 92 and biased into engagement with the wheel 188 by a spring 94. A relatively small pulley 96 integrally formed on the upper side of the rubber tired friction wheel 90, as shown in FIG. 14, operates through a belt 98 to drive a larger pulley 100 nonrotatably mounted on the drive shaft 60 for the tape driving element 56.

The tape 48 to be played is supported on edge in the path 50 and has at least two laterally spaced recorded channels which are vertically spaced with respect to the tape deck 32. The particular tape deck 32 illustrated is designed to reproduce stereophonic sound and the tape used has four sound tracks, two of which are played as the tape is moved in one direction through the path 50 and two of which are played as the tape is moved in the other direction through the path, as will presently appear.

The tape moved through the path 50 is played through two horizontally spaced pickups or pickup heads 102, 104, FIGS. 1, 7 and 9, mounted on the side of the tape path 50 opposite from the supports 52, 54 for shifting movement, as will presently appear, from retracted, tape releasing positions to advanced, tape playing positions immediately adjacent the path 50. The two pickups 102, 104 are spaced from each other so that when advanced into tape playing positions, as shown in FIG. 7, the pickup 102 occupies an intervening position between the support 52 and the tape driving element 56. Similarly, the pickup 104 is situated between the support 54 and the driving element 58.

Both pickups 102, 104 are mounted on a generally rectangular slide plate 106 supported on the mounting plate 40 for translation between guides 108, 110 between a retracted tape releasing position, in which the pickups 102, 104 are spaced from the path 50, and a tape playing position in which the slide is advanced toward the tape path.

The slide 106 also carries electrically operated controls which control the direction of movement of the tape through the path 50 in a manner which provides for substantially instantaneous reversal of the direction of movement of the tape as the opposite ends of the tape are approached in the course of playing the tape.

As shown in FIGS. 7 and 8, two platen rollers 112, 114 are journaled on the tape ends of two swingable levers 116, 118 medially supported on two pivots 120, 122 on the slide 106. The opposite ends of the levers 116, 118 connect with the two two-direction control solenoids 124, 126 which operate respectively to swing the respective levers 116, 118 in directions which move the platen rollers 112, 114 toward the tape driving elements 56 and 58 to firmly engage tape in the path 50 and force the tape hard against the respective driving elements. As will be described presently in detail, both the levers 116, 118 are spring urged to swing the respective rollers 112, 114 away from the driving elements 56, 58 to allow the tape to move freely between the platen rollers and driving elements without substantial frictional engagement with either driving element.

The levers 116, 118 are operated by the solenoids 112, 126 and interconnected with each other in a fashion such that only one of the rollers 112, 114 is advanced into its tape engaging position at a time. Moreover, a platen roller, previously engaged with the tape to hold the tape firmly against the tape driving element, is released and retracted from the tape path automatically as an incident to the advancement of the other platen roller to an operative position. Thus, energization of the solenoid 124, for example, swings the lever 116 in a clockwise direction with reference to FIG. 7, to cause the roller 112 to force tape firmly against the driving element 56, which operates to move the tape 48 to the left through the path 50. A spring latch 128 engages the solenoid end of the lever 116 to hold the roller 112 firmly in its operative position. The solenoid 124 is deenergized after having moved the lever into the operative position in which it is latched.

As will be described presently, a tape reversing switch 130 is operated automatically as an incident to substantial completion of movement of the full effective length of the tape 48 in one direction through the path 50. The reversing switch 130 operates through reversing structure to be described to energize the other solenoid 126 to swing the lever 118 in a counterclockwise direction with reference to FIG. 7, to force the tape firmly against the other driving element 58, which operates to pull the tape in the opposite direction through the path 50. A link 132 connected to the lever 118 extends into coacting relation to the previously mentioned latch 128 to release the lever 116 to effect automatic retraction of the platen roller 112 to inoperative position substantially simultaneously with movement of the platen roller 114 into operative position.

After the effective length of the tape has been run through the path 50 in the other direction, a second reversing switch 134, FIG. 7, is closed, as will be described, to effect energization of the solenoid 124 to again reverse the direction of movement of tape through the path 50. It should be noted that a latch 136, similar to the latch 128, coacts with the lever 118 to hold the latter in its operative or advanced position. Swinging of the other lever 116 into advanced position, to again reverse the direction of the tape as recited, operates a link 138 to release the latch 136 to automatically effect disengagement of the roller 114 from the tape.

Figure 17:
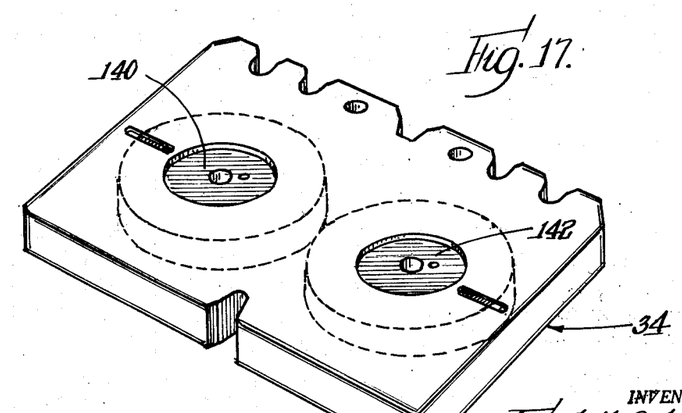
FIG. 17 is a perspective view of a typical tape cartridge used with the machine.

The tape moving through the path 50 is removed from a coacting one of the tape cartridges 34 and immediately returned to the cartridge which contains two rotary tape reels 140, 142, FIG. 17. The reel from which tape is being removed is rotated by the tension applied to the tape by the active one of the tape driving elements 56, 58. The other reel is rotated to take up the tape by a coacting tape rewind drive on the tape deck 32. Preferably, two separate rewind drives 144 and 146 are provided for the respective tape reels. The two rewind drives 144, 146 are horizontally spaced from each other across the front of the tape deck 32, as shown in FIG. 7. The two drives are formed substantially as mirror images of each other, the drive 146, for example, comprising an electric motor 148, FIG. 5, connected through a worm 150 and worm gear 152 with a shaft 154 which drives a rubber tired friction wheel 156 in a given direction. Similarly, the drive 144 operates to drive a rubber tired friction drive wheel 158 in a direction of rotation opposite to that of the wheel 156.

Upon operation of the carriage 38 to bring one of the cartridges 34 into playing position, as will presently appear, the rewind driving wheels 156, 158 have an effective alinement with two rubber tired driven wheels 160, 162, journaled on the carriage 38 in driving relation to the respective reels 142, 140 of the coacting cartridge, as will presently appear.

Energization of the respective drives 144, 146 and effective connection of the friction driving wheels 158, 156 with the coacting driven wheels 162, 160 is controlled automatically as an incident to operation of the reversing solenoids 124, 126. Thus, energization of the solenoid 126 to effect movement of tape to the right, FIG. 7, through the path 50 causes a lug 164 on the link 132 to close switch means 166 which energizes the driving motor 148 for the drive 146. Similarly, energization of the solenoid 124 to effect movement of the tape through the path 50 in the opposite direction causes a lug 168 on the link 136 to operate switch means 170 for energizing the driving motor for the other drive 158.

Rotary motion of the driving wheel 158 is transmitted to the coacting driven wheel 162, FIG. 7, through a retractable small diameter idler wheel 172 which is automatically extended into engagement with both the wheels 158, 162 as an incident to swinging of the arm 116 into operative position. As shown in FIGS. 7 and 8, the idler roller 172 is carried by a slide 174 which is engaged by a blade 176 on a depending ear 178 of the arm 116 to shift the roller 172 into engagement with the wheels 160, 162 as the lever 116 swings into an operative position for effecting movement of tape to the left through the path 50. A tension spring 180 connected between a guide stud 182 and the roller slide 174, as shown in FIG. 8, urges both the roller 172 and the lever 116 to retracted inoperative positions.

In a similar manner, the driving wheel 156 is drivingly connected to the wheel 160 through a retractable idler roller 184 carried by a slide 186 which is forced into operative position by a blade 188 on the lever 118 and retracted by a spring 190 which urges both the roller 184 and the lever 118 toward inoperative positions.

It should also be noted that the slide 106 which supports the platen carrying arms 116, 118 and the pickups 102, 104 also carries a tape support and guide element 192, located between the pickups 102, 104, which engages the tape to hold the tape at the desired vertical level with respect to the pickups 102, 104.

These pickups 102, 104 are effectively displaced vertically with respect to each other so that the pickup 102 effectively plays two stereophonic channels of the tape as it moves in one direction through the path 50, and the pickup 104 effectively plays other stereophonic channels of the tape as it moves in the opposite direction through the path 50.

As will be described later in greater detail, the two pickups 102, 104 are selectively switched into and out of selected playing circuits by switches included in the respective switch means 166, 170 previously described. Thus, each of the switch means 166, 170 comprises a double pole switch, as shown, which controls one of the pickups as well as one of the rewind drives 144, 146, as described.

As previously intimated, the slide 106 which supports the pickups 102, 104 and platen rollers 112, 114 is urged forwardly to a normal tape playing position by means of a tension spring 194, FIG. 7. When a tape in the path 50 is to be replaced with a different tape, the slide 106 is retracted from its tape playing position by energization of a retractor solenoid 196. This separates the tape engaging elements on opposite sides of the path 50 to provide for easy replacement of the tape in the path. Retraction of the slide 106 operates switch means 198 to place a resistor (not shown) in series with the solenoid 196 to reduce the current flow through the solenoid to a value just sufficient to hold the slide 106 in retracted position until substitution of a new tape into playing position has been completed, as will presently appear.

*Tape Cartridge Support Carriage*

Structurally, the tape cartridge support carriage 38, previously mentioned, comprises an annular plate 200 which provides support for four circumferentially spaced tape mounts 202, of identical construction, which are adapted to receive individual tape cartridges 34 of standard construction.

Figure 3:
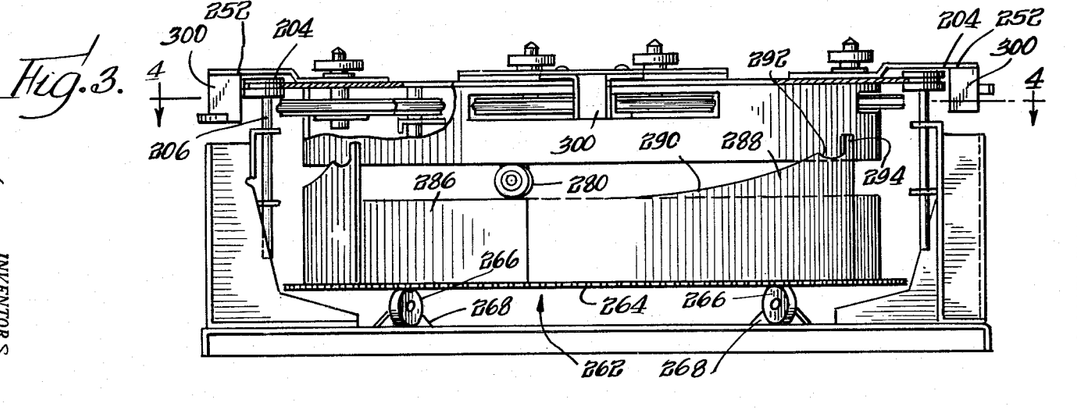
FIG. 3 is an elevational view generally similar to FIG. 4 with certain parts broken away for clearness in illustration and showing the tape support carriage lowered to playing position.

The plate is guided for rotation about its own axis by means of four notched guide rollers 204 which engage the periphery of the plate 200 in substantially equally spaced relation to each other, as shown in FIGS. 1, 3 and 5. The respective guide rollers 204 are nonrotatably fixed to the upper ends of four rotary guide stems 206 slidably mounted in bearings 208 in four circumferentially spaced support brackets 210, 212, 214 and 216, which extend upwardly from the base plate 44.

Figure 16:
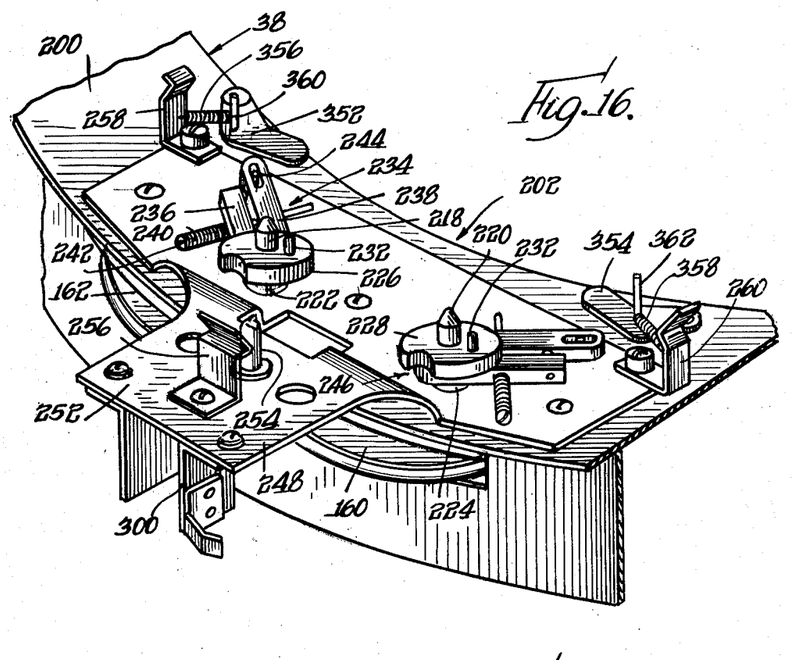
FIG. 16 is a perspective view of tape cartridge support structure on the tape support carriage.

Each cartridge mount 202 comprises two spaced reel driving shafts 218, 220, FIGS. 1 and 16, journaled in circumferentially spaced relation to each other in support bearings 222, 224 mounted on the plate 200. The upper ends of the respective shafts 218, 220 carry discs, 226, 228 adapted to underlie the reels 140, 142 of a tape cartridge 34 placed on the mount. Rotation of the reels 140, 142 is effected through driving tangs 230, 232 projecting upwardly from the respective discs 226, 228. The previously mentioned rubber tired driven wheels 162, 160 are nonrotatably connected to the respective driving shafts 218, 220, to rotate the shafts with the driving wheels in opposite directions.

A frictional drag is applied to both reel shafts 218, 220 to prevent over-running of the tape reel from which the tape is being removed. A brake 234 applied to the shaft 218 for this purpose comprises a pair of opposed brake arms 236, 238 engaging opposite sides of the shaft 218. The opposed arms are urged toward each other to apply a braking force to the shaft by means of a compression spring 240 which can be adjusted by a screw 242 extending through the arm 236 into threaded engagement with the arm 238 to vary the degree of braking force. The arms 236, 238 are anchored against rotary movement by a pin 244 extending into the outer end of the arm 238, as shown in FIG. 16. A brake 246 coacting with the shaft 220 is similar in construction to the brake 234 on the shaft 218.

A tape cartridge 34 is demountably supported in coacting relation with the shafts 218, 220 by means of a bracket 248 fixed to the upper side of the annular plate 200, as shown in FIG. 16. The bracket 248 includes a central ear 252 projecting radially outward from the plate 200 and supporting an upwardly extending locating pin 254 adapted to fit into a coacting cartridge 34. Three cantilever spring detents 256, 258 and 260 fixed to the bracket 248 project upwardly from the bracket to engage and releasably hold a coacting tape cartridge 34 in its mounted position on the carrier 38.

*Carriage Transfer Means*

The previously mentioned guide rollers 204 supported on the axially movable shafts 206 allow the carriage 38 to move vertically upward from its normal tape playing level, shown in FIG. 3, to an elevated indexing level, shown in FIG. 5, while at the same time continuously holding the carriage in concentric relation to a predetermined axis of rotation of the carriage and providing for free rotary movement of the carriage with respect to its axis of rotation.

The carriage thus guided is shifted from its tape playing level up to its elevated indexing level, rotated about its own axis to bring a desired one of the cartridges 34 on the carriage into rotary alinement with the tape playing station 36 of the tape deck 32, and lowered vertically downward to its tape playing level to bring a new tape into playing position, all in response to controlled rotary movement of an annular transfer element rotatably supported in underlying relation to the carriage and designated generally by the number "262."

As shown in FIGS. 3, 5 and 6, the annular transfer element 262 comprises a flat annular base plate 264 supported for rotation on four rollers 266 journaled on four circumferentially spaced pillow blocks 268 on the bottom plate 44 of the machine. The annular plate 264 is guided for rotation in concentric relation to its axis of rotation by means of three guide wheels 270, FIG. 6, supported on the bottom plate 44 and engaging the inner periphery of the plate 264.

The transfer element 262 is rotated in opposite directions, as will presently appear, by means of a reversible electric motor 272, FIG. 1, connected through a speed reducing transmission 274 with a pinion 276 which meshes with a ring gear 278 formed on the periphery of the annular plate or disk 264.

Figure 2:
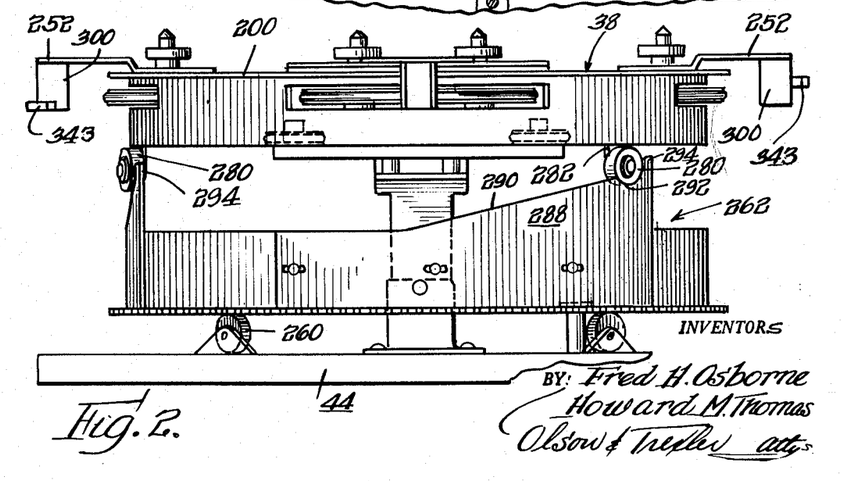
FIG. 2 is an elevational view of the machine showing the tape cartridge support carriage shifted to its elevated indexing level.

The carriage 38 is supported on the transfer element 262 by means of three rollers 280 journalled, as shown in FIGS. 2, 4 and 5, on the lower ends of three circumferentially spaced roller brackets 282 fixed to and depending downwardly from a cylindrical skirt 284 secured to the lower side of the carriage plate 200.

The three circumferentially spaced support rollers 280 overlie the upper edge of a short cylindrical support element 286 fixed to and projecting upwardly from the upper face of the annular disk 264 of the transfer element 262. Vertical translation of the carriage 38 is effected by coaction of the rollers 280 with three circumferentially spaced arcuate cam plates 288 supported on edge on the upper face of the transfer plate 264 and secured to the adjacent outer surface of the cylindrical element 286. The three cam plates 288 are identical.

As shown in FIG. 3, the upper edge of a typical cam plate 288 defines an upwardly sloping cam surface or track 290 which merges at its lower end with the upper edge of the cylindrical element 286. The cam surfaces 290 rise upwardly in a counterclockwise direction when viewed from above. The upper end of the cam surface 290 on each cam plate joins a roller receiving recess or pocket 292 formed in the cam plate immediately adjacent an integral abutment 294 on the cam plate which projects above the side of the recess 292 opposite from the cam track 290.

To lift the carriage 38 from its playing position to its elevated indexing position, the carriage is held against rotation while the transfer element 262 is rotated in the clockwise direction as viewed from above. This brings the cam track 290 into engagement with the rollers 280 to force the carriage to it indexing level where the rollers 280 move into the recesses 292 and engage the abutment 294 on the cam plate. At this time, the carriage 38 is automatically released, as will be explained presently, to rotate with the transfer element 262, the rollers 258 resting in the recesses or saddles 292.

Rotary movement of the desired tape cartridge 34 into rotary alinement with the tape playing station 36 is electrically sensed by control means to be described which operates to reverse the direction of rotation of the transfer element 262. Stop means to be described coacts with the carriage 38 to hold the latter against reverse rotation from the desired index position, whereupon continued rotation of the transfer element 262 causes the support rollers 280 to move out of the recesses 292 and down the cam tracks 294, to progressively lower the carriage to its playing level where it is supported by engagement of the rollers 280 with the upper edge of the cylindrical element 286.

*Indexing Control Structure*

The carriage 38 is held in its several indexing positions and guided for vertical movement between its playing level and its indexing level by means of four vertical, outwardly facing brackets 300 fixed to and depending from the projecting ears 252 on the respective carriage brackets 248, FIGS. 3, 10, 11 and 16. The rotary movement of one of the cartridge holders 202 into rotary alinement with the tape playing station 36 brings the coacting guide channel 300 on the carriage into rotary alinement with a vertical guide slide 302 supported on a bracket 304 for vertical movement, as will presently appear, between a raised position and a lowered carriage releasing position. During rotary indexing movement of the carriage 38, the guide slide 302 occupies its lowered position, shown in FIG. 10, where the slide is cleared by the moving guide channels 300.

Figures 10, 11, 12, 13:
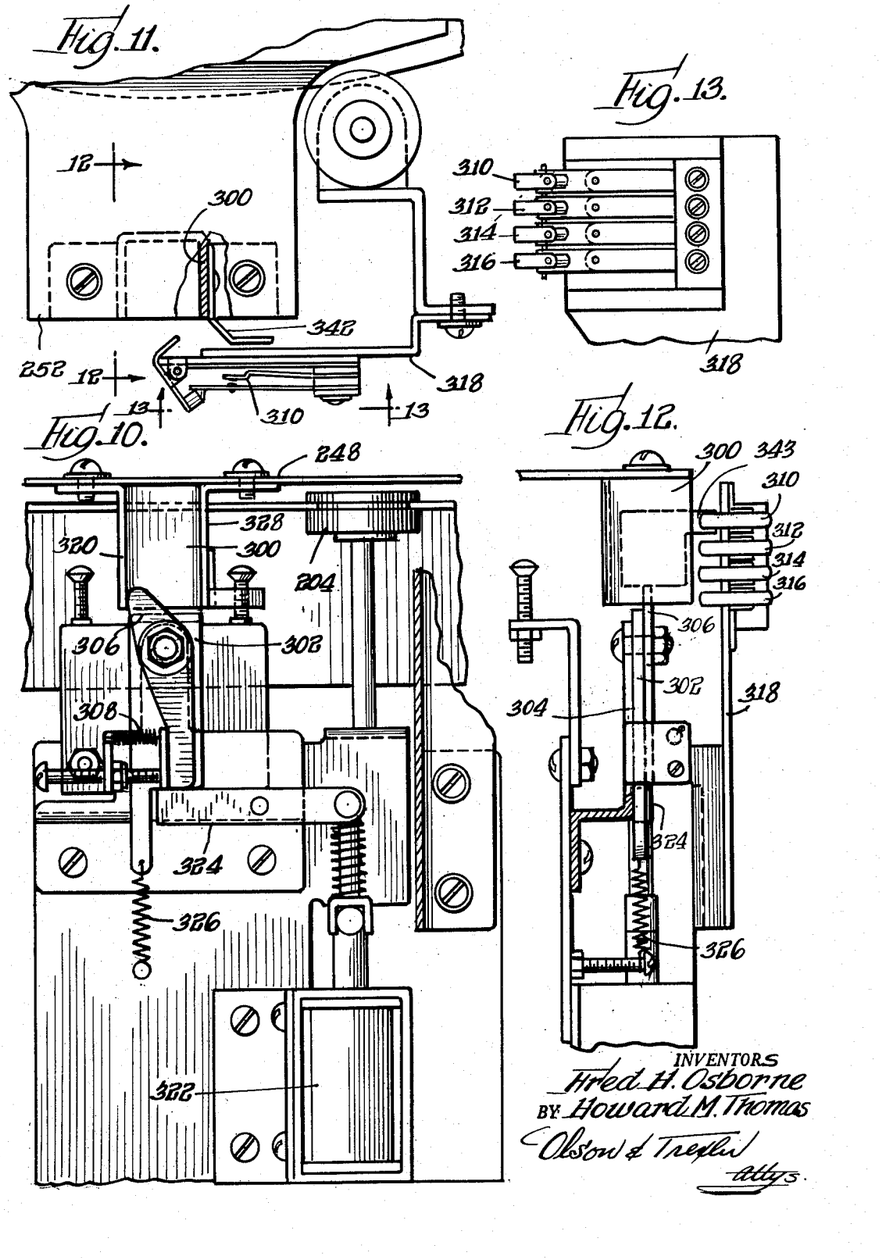
FIG. 10 is a fragmentary elevational view taken with reference to the line 10—10 of FIG. 1.
FIG. 11 is a plan view of the structure appearing in FIG. 10.
FIG. 12 is a vertical sectional view taken along the line 12—12 of FIG. 11.
FIG. 13 is a fragmentary elevational view taken with reference to the line 13—13 of FIG. 11.

As the carriage 38 is rotated in its indexing direction, the lower ends of the depending channels 300 move into engagement with the upper end of a medially pivoted, one-way stop dog 306 and pivot the dog in a counterclockwise direction with reference to FIG. 10 against a spring 308.

Movement of the desired one of the four cartridges 34 on the carriage into rotary alinement with the tape playing station 36 is sensed by one of four carriage position sensing switches 310, 312, 314 and 316 supported on a bracket 318 alongside the slide 302, as shown in FIGS. 10 to 13. The actuated carriage position sensing switch operates through circuits to be described to effect reverse movement of the transfer element 262.

The reversal of the direction of the rotary movement of the element 262 is timed so that the leading edge 320, FIG. 10, of the channel 300, corresponding to the selected cartridge 34, passes beyond the upper end of the locking dog 306, allowing the dog to snap into the channel.

Simultaneously with reversal of the direction of movement of the transfer element 262, a solenoid 322, FIG. 10, is energized and operates through a lever 324 to urge the slide 302 upwardly against the yieldable force of a spring 326.

The one-way dog 306 acts against the channel edge 320 to stop reverse movement of the carriage 38 when the channel edge 320 is alined with the corresponding side edge of the slide 302. As soon as the trailing edge 328 of the channel 300 clears the corresponding edge of the slide 302, the slide immediately moves upwardly into the channel to hold it in its indexed position.

Continued reverse rotary movement of the transfer element 262 operates, as previously described, to lower the carriage 38 to its playing position, bringing the exposed medial portion of the tape in the selected cartridge 34 down into the tape path 50 on the tape deck 32.

After the carriage 38 has been completely lowered to its playing position, one of four equally spaced switch actuating blocks 330 secured to the underside of the transfer element disk 264 operates a normally closed switch 332 on the floor plate 44, FIG. 6, to deenergize the motor 272 and stop rotation of the transfer element 262.

To select another tape cartridge for playing it is necessary merely to rotate a control knob 340 to a "select" position corresponding to the desired tape. Control circuits, to be described in detail, respond to positioning of the knob 340 to energize the motor 272 to rotate the transfer element 262 in an indexing direction and to activate one of the carriage position sensing switches 310 to 316. As the transfer element 262 starts to rotate in the clockwise direction, with reference to FIG. 6, one of the switch operators 330 attached to the lower side of the transfer element and having substantial arcuate length engages a normally open switch 342 to energize the solenoid 322 to again project the guide slide 302 to its uppermost position. It should be mentioned here that the solenoid 322 was previously deenergized simultaneously with deenergization of the motor 272 at the conclusion of the previous indexing cycle.

As the carriage 38 reaches its indexing level where the rollers 280 move into the saddles 292, the active switch operator 330 previously engaged with the switch 342 moves out of engagement with the switch 342 to deenergize the solenoid 322, whereupon the slide 302 is pulled downwardly out of the coacting channel 300 to release the carriage for rotation, as described.

Each of the vertical channels 300 on the carriage 38 carries a radially projecting switch actuating arm 343 for actuating a corresponding one of the position sensing switches 310 to 316 as the channel moves into its indexed position. The arms 343 of the respective channels 300 are differentially spaced vertically from each other to correspond to and operate the respective vertically spaced switches 310, 316 to produce the previously described reversal of the direction of rotary movement of the transfer member 262. It is also noteworthy that control circuitry to be described responds to operation of the selector knob 340 to energize the solenoid 196 on the tape deck 32 to retract the slide 106 simultaneously with energization of the motor 272, to start rotation of the indexing element 262. Lifting of the carriage 38 allows a double pole switch 350 to close to continue energization of the slide retracting solenoid 196. The switch 350 is automatically opened by a coacting one of the channels 300 as the carriage 38 is lowered and is lowered, as recited, upon lifting of the carriage. However, upon subsequent lowering of the carriage 38 and opening of the switch 350, energization of the slide retracting solenoid 196 is continued until the previously mentioned switch 332 is opened to deenergize the transfer motor 272.

Further, in relation to the automatic operation of the tape deck 32, it will be noted, with reference to FIGS. 1 and 16, that two tape reversing control arms 352, 354 are pivotally mounted on the carriage plate 200 at each of the cartridge stations 220. The arms are individually urged to retracted positions by tension springs 356, 358. Upon lowering of the carriage 38 into playing position, the control arms 352, 354 corresponding to the cartridge in playing position oppose the previously described reversing switches, 130, 134 on the tape deck. Segments of the tape issuing from the respective reels 140, 142 of the cartridge being played are trained around upwardly protruding projections 360, 362 on the adjacent control arms in such fashion that the inducement of abnormal tension in the tape moving around one of the projections causes the coacting control arm to swing toward the tape deck and cooperate with the coacting reversing switch, to reverse the movement of the tape through the tape deck.

This tightening of the tape occurs as each end of the tape is reached and effects an immediate reversal of the tape movement to continue the program without interruption, as described.

Electrical Control Circuits

Figure 18:
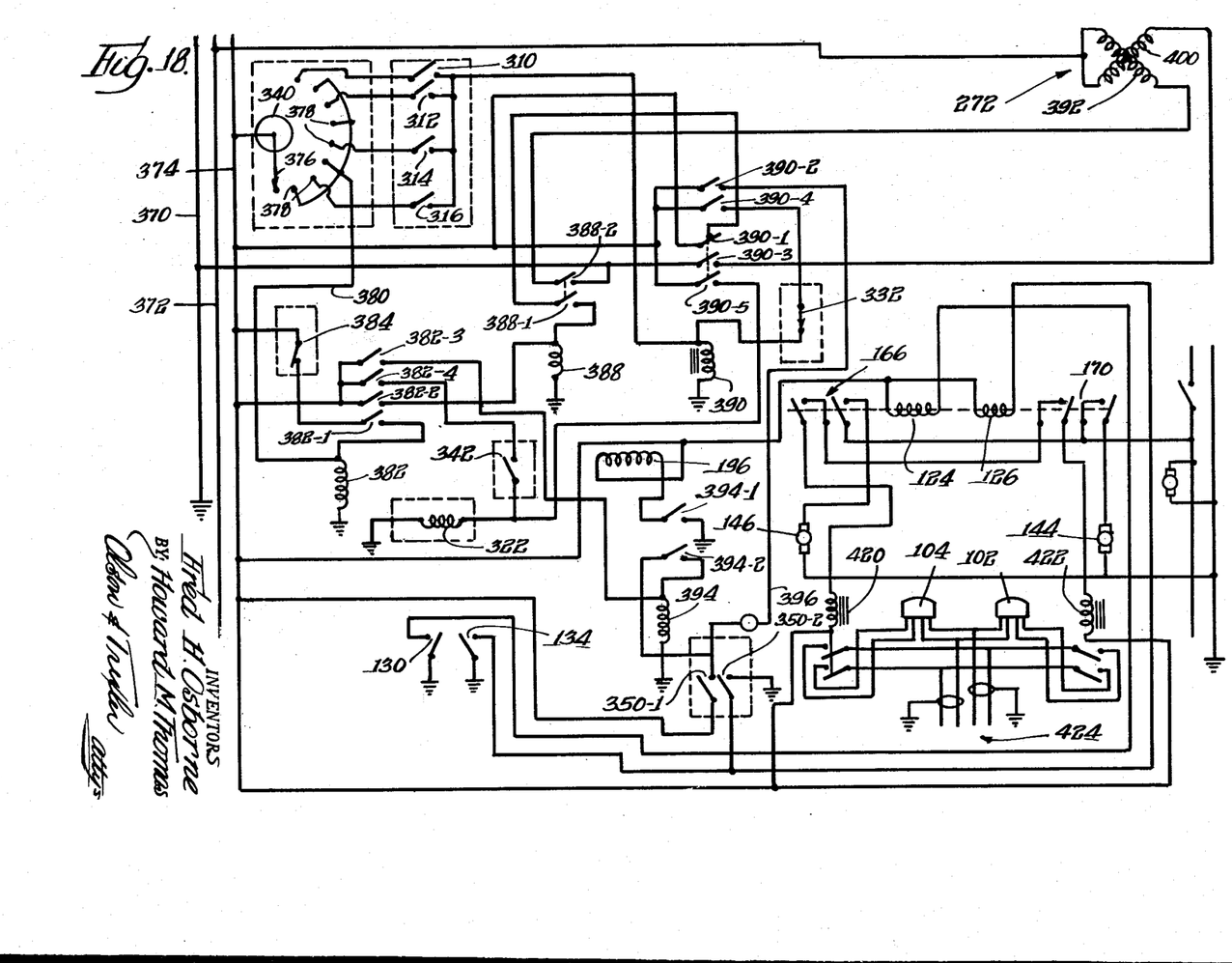
FIG. 18 is a diagrammatic illustration of electrical control circuits used in the machine.

The electrical control circuits used in the machine are illustrated diagrammatically in FIG. 18. As shown, operating power is supplied through a grounded power line 370, a 24 volt. A.C. power line 372 and a 24 volt D.C. line 374.

The previously mentioned selector knob 340 is connected to swing a movable contact 376 from a starting or "off" position, shown in FIG. 18, across a series of contacts 378. The movable contact 376 is connected to the D.C. power line 374. Starting with the contact immediately adjacent the off position of the contact 376, alternate ones of the contacts 378 are connected through a conductor 380 to energize a grounded relay 382. The alternate contacts 378 not connected with the relay conductor 380 are connected, respectively, to the previously mentioned carriage position sensing switches 310, 312, 314, 316.

Hence, in moving from its off position into engagement with any one of the contacts 378 connected with one of the sensing switches 310 to 316, or in moving from one to the other of the contacts 378 connected to the sensing switches, the movable contact 376 must momentarily engage one of the contacts 378 connected to the relay energizing conductor 380.

Hence, operation of the knob 340 to effect selection of a tape for playing necessarily energizes the relay 382 which controls a holding switch 382–1 to continue energization of the relay 382 through a normally closed drop-out switch 384.

As shown in FIG. 6, the drop-out switch 384 is supported on the bottom plate 44 of the machine and is opened shortly after the transfer element 262 starts to rotate by one of four circumferentially spaced switch actuating elements 386 extending upwardly from the transfer plate 264. This, of course, deenergizes the relay 382. However, before this happens, the relay switch 382–2 is closed to energize a motor start relay 388, FIG. 18. The relay 388 closes a holding switch 388–1 to continue energization of the relay 388 through a normally closed relay switch 390–1 connected to the power line 374.

The relay 388 also closes a switch 388–2 to energize one winding 392 of the indexing motor 272 to drive the indexing element 262 in the forward direction.

The initially energized indexing relay 382 also closes a switch 382–3 to energize a retractor control relay 394. The relay 394 closes a switch 394–1 to energize the slide retracting solenoid 196 on the tape deck 32 to release the tape from the path 50, as described. The relay 394 also closes a holding contact 394–2 which connects the relay 394 to a conductor 396 connected to the power line 374, through a normally open relay switch 390–2 and one pole of the previously mentioned switch 350, FIG. 6, which is designated in FIG. 16 as 350–1.

The relationships of the mechanical parts are such that by the time the drop-out switch 384 has been operated, by rotation of the transfer element 262, to effect opening of the switch 382–3, the carriage 38 will have risen sufficiently to effect closing of the normally open switch 350–1 to continue energization of the retractor control relay 394. This operates to continue energization of the retractor solenoid 196 during an indexing cycle, as previously described.

Initial energization of the index relay 382 also closes a switch 382–4 to supply power to one side of the previously mentioned index solenoid control switch 342, the other side of which is connected to energize the solenoid 322. The relay switch 382–4 remains closed while the switch 342 is temporarily closed mechanically by a coacting actuator 330, FIG. 6, as described, to hold the carriage 38 against rotation until it has reached its indexing level.

As shown in FIG. 18, the output sides of all the carriage position sensing switches 310, 312, 314 and 316 are connected to energize a reversing relay 390. Hence, upon closure of the position sensing switch which is energized through the knob control contact 376, which occurs when the desired tape cartridge has reached its indexed position, the reversing switch 390 operates to open the normally closed relay switch 391–1, previously mentioned.

This discontinues energization of the motor start relay 388, allowing the switch 388–2 to open and stop forward rotation of the transfer element 262.

At the same time, the relay 390 closes a motor reversing switch 390–3 to energize the reverse winding 400 of the motor 272.

Relay switch 390–4 closes to continue energization of the relay 390 through the previously mentioned, normally closed table stop switch 332. It will be recalled that the switch 332 is mechanically opened by rotation of the transfer element 262 at the completion of an indexing cycle. It serves to deenergize the relay 390 and stop the motor 272. Energization of the relay 390 closes the previously mentioned relay switch 390–2, to continue energization of the slide retracting solenoid 196 subsequent to opening of the switch 350–1. Hence, deenergization of the solenoid 390 deenergizes the slide retracting solenoid 196 simultaneously with stopping of the motor 272.

Also, energization of the reversing solenoid 390 closes a switch 390–5 to reenergize the solenoid 322 to move the slide 302, FIG. 10, upwardly until the reverse movement of the motor 272 is stopped.

As shown in FIG. 18, the two reversing switches 130, 134 are connected to energize the respective reversing solenoids 126, 124 on the tape deck. The switches 166, 170 operated by the solenoids 126, 124, as previously described, control energization of the tape take-up drives 146, 144, and control relays 420, 422 to effect selective connection of the pickups 104 and 102 to output conductors 424. A switch 350–2 forming one pole of the switching means 350 is interconnected with the reversing solenoid 126 to energize the latter as an incident to lifting of the carriage 36 to precondition the tape deck to start movement of the tape to the right, with reference to FIG. 7, after a new tape has been moved into playing position.

It will be appreciated that the invention is not limited to use of the particular construction illustrated, but includes variants and alternatives within the spirit and scope of the claims.

The invention is claimed as follows:

1. An automatic tape player for playing a plurality of tapes selectively in any desired order comprising, in combination, a stationary tape deck defining a path for tape to be played and including a pickup on one side of said path and tape moving means for moving tape through said path, a rotatable tape support carriage, a circumferential series of mounts on said carriage adapted to support individual tapes, said carriage having a normal tape playing position which supports said mounts at a tape playing level with respect to said tape deck, rotary transfer means including a plurality of cams coacting with said carriage to lift the latter from the normal playing level thereof to an elevated indexing level, said rotary transfer means including means for rotating said carriage at said indexing level to bring the successive mounts on the carriage into rotary alignment with said path for tape on said tape deck, and means for operating said transfer means to lower said carriage to bring into tape playing relation to said tape deck the tape mount on said carriage rotatably aligned with said deck.

2. An automatic tape player for playing a plurality of tapes selectively in any desired order comprising, in combination, a stationary tape deck defining a path for tape to be played and including a pickup adjacent said path, means for moving tape through said path, a movable tape carriage, a series of mounts on said carriage adapted to support individual tapes, said carriage having a normal tape playing position which supports said mounts at a tape playing level with respect to said tape deck, transfer means coacting with said carriage to lift the latter from the normal playing level thereof to an elevated indexing level, said transfer means including means for moving said carriage at said indexing level to bring individual mounts on the carriage into alignment with said path for tape on said tape deck, and means for operating said transfer means to lower said carriage to bring into tape playing relation to said tape deck the tape mount on said carriage aligned with said deck.

3. In a tape playing machine for selectively playing a plurality of tapes, the combination of a stationary tape deck having means for playing tape moved into a tape playing station defined by the deck, a tape carriage including means for supporting a plurality of tapes for movement by the carriage individually and selectively into said tape playing station, means for locating said carriage in various indexed positions aligned with said tape playing station, guide means coacting with said carriage when the latter is in any one of the indexed positions thereof to guide the carriage for movement between a tape playing position and an indexing position, transfer means coacting with said carriage to move the latter to said indexing position upon movement of the transfer means in an indexing direction, means on said transfer means coacting with said carriage to index the latter after the carriage is moved to its indexing level, and sensing means coacting with said carriage and with said transfer means to reverse movement of the latter to effect movement of the carriage to its tape playing position in response to movement of the carriage into a selected indexed position.

4. In a tape playing machine for selectively playing a plurality of tapes in individual cartridges, the combination of a tape deck having means for playing tape moved into a tape playing station defined by the deck, a tape carriage including means for supporting an annular array of tapes for movement by the carriage individually and selectively into said tape playing station, means for locating said carriage in various indexed positions rotatably spaced from each other, guide means coacting with said carriage when the latter is in any one of the indexed positions thereof to guide the carriage for movement vertically between a lower tape playing level and an elevated indexing level, rotary transfer means coacting with said carriage to lift the latter to said indexing level upon rotation of the transfer means in an indexing direction, means coacting with said carriage to hold the latter against rotation until the carriage has reached the indexing level thereof, means interconnecting said transfer means with said carriage to rotate the latter with said transfer means after the carriage is raised to its indexing level, sensing means coacting with said carriage and with said transfer means to reverse rotation of the latter to effect lowering of the carriage to its tape playing level after movement of the carriage to a desired rotary position, and stop means coacting with said carriage to preclude reverse rotary movement thereof out of the indexed position thereof upon reverse of movement of said transfer means which lowers the carriage.

5. In a machine for playing a plurality of individual tapes positioned in the machine, the combination of a tape deck including means for playing tape moved into a tape playing station defined by the deck, a rotatable tape support including means for supporting a series of tapes thereon, transfer means coacting with said tape support to index the latter to selected playing positions which bring the tapes on the support selectively into said playing station, means for moving said transfer means in an indexing direction, shifting means coacting with said transfer means and said tape support to move the latter from any tape playing position to an indexing position upon movement of said transfer means in said indexing direction, restraining means coacting with said tape support to hold the latter against indexing movement during movement thereof to said indexing position, means coacting with said restraining means to release said tape support for indexing movement upon movement of the tape support to its indexing positions, means for preselecting individual tapes for playing sensing means responsive to movement of said tape support and coacting with said preselecting means and said transfer means to effect reverse movement of said transfer means upon movement of a preselected tape into alignment with said tape deck, playing station, stop means coacting with said tape support to preclude reverse movement thereof out of an indexed position upon reverse movement of said transfer means, and said shifting means coacting with said tape support to effect movement of said carriage to a tape playing position as said transfer means moves in a reverse direction.

6. A machine for playing a plurality of individual tapes in any desired order, the combination of a tape deck including means for playing tape lowered into a tape playing station defined by the deck, a rotatable tape carriage including holders for supporting a plurality of tapes thereon, transfer means coacting with said carriage to index the latter to any one of a plurality of rotatably spaced playing stations corresponding to said respective holders on the carriage, means for rotating said transfer means in an indexing direction, means coacting with said transfer means and said carriage to move the latter upwardly from a tape playing level relative to said tape deck to an elevated transfer level upon rotation of said transfer means in said indexing direction, restraining means coacting with said carriage to hold the latter against rotation during upward movement thereof, means coacting with said restraining means to release said carriage for rotation upon movement thereof to its indexing level, means for preselecting individual ones of said tape holders for playing tape, sensing means responsive to rotation of said carriage and coacting with said preselecting means and said transfer means to effect reverse rotation of the transfer means to lower said carriage into tape playing position after movement of a preselected holder into alignment with said playing station, two tape moving elements in said playing station for moving tape in opposite directions therethrough, a slide supported for lateral movement with respect to tape in said station, retractable tape backup elements supported on said slide for movement therewith, pickup means supported on said slide, means urging said slide to a playing position to carry said backup elements and said pickup means toward tape in said path, means coacting with said slide to retract the latter to a tape exchanging position during rotation of said transfer means, biasing means coacting with said backup elements to retract the latter away from said tape moving elements, two tape direction control solenoids coacting with said respective backup elements to extend the latter to hold tape against said respective tape moving elements when said slide is advanced, holding means coacting with said respective backup elements to hold the latter in the extended positions thereof, and means interconnecting each backup element with said holding means to effect as an incident to movement of either backup elements to its extended position an automatic release of the other backup element for retraction by said backup element biasing means.

7. In a machine for playing a plurality of individual tapes in any desired order, the combination of a tape deck including means for playing tape lowered into a tape playing station defined by the deck, a rotatable tape carriage including holders for supporting an annular array of tapes in circumferentially spaced positions on the carriage, transfer means coacting with said carriage to index the latter to any one of a plurality of rotatably spaced playing stations corresponding to said respective holders on the carriage, means for rotating said transfer means in an indexing direction, cam means coacting with said transfer means and said carriage to move the latter upwardly from a tape playing level relative to said tape deck to an elevated transfer level upon rotation of said transfer means in said indexing direction, restraining means coacting with said carriage to hold the latter against rotation during upward movement thereof, means coacting with said restraining means to release said carriage for rotation upon movement thereof to its indexing level, means for preselecting individual ones of said tape holders for playing tape, sensing means responsive to rotation of said carriage and coacting with said preselecting means and said transfer means to effect reverse rotation of said transfer means upon rotary movement of a preselected holder into rotary alignment with said tape playing station, and stop means coacting with said carriage to preclude reverse rotation thereof out of an indexed position upon reverse rotation of said transfer means, said cam means coacting with said carriage to effect lowering of said carriage to a tape playing position as said transfer means rotates in a reverse direction.

8. A machine for playing a plurality of individual tapes in any desired order, comprising, in combination, a tape deck defining a substantially fixed path for stationary tape and including pickup means for playing a tape moved through said path, two rotary driving elements mounted alongside said path for moving tape in opposite directions therethrough, driving means coacting with said driving elements to continually rotate the latter, tape direction control means coacting with said respective driving elements to render the latter operative alternately to pull tape past said pickup means in opposite directions, two tape takeup drive wheels rotatably mounted on said tape deck, power drive means coacting with said takeup drive wheels to rotate the latter, a rotatable tape carriage, a series of tape cartridge mounts on said carriage, each of said mounts including a pair of counterrotating takeup wheels adapted to coact with a tape cartridge, means on said tape deck for connecting said takeup drive wheels alternately to the respective takeup wheels of the cartridge mount positioned in alignment with said tape deck, and means for indexing said carriage to bring individual ones of said cartridge mounts selectively into tape playing alignment with said tape deck to locate selected tapes in said path for playing.

9. A machine for playing a plurality of individual tapes in any order, comprising, in combination, a tape deck defining a substantially fixed path for stationary tape and including a pickup for playing a tape moved through said path, two rotary driving elements mounted alongside said path for moving tape in opposite directions therethrough, tape direction control means coacting with said respective driving elements to render the latter operative alternately to pull tape past said pickup means in opposite directions, a rotatable tape carriage, a plurality of tape supports on said carriage, each of said tape supports including a pair of counterrotating takeup wheels adapted to coact with a tape on the tape support, means including two takeup drive wheels for driving alternately the takeup wheels of the tape support positioned in alignment with said tape deck, and means for indexing said carriage to bring individual ones of said supports selectively into tape playing alignment with said tape deck.

References Cited in the file of this patent

UNITED STATES PATENTS

| | | |
|---|---|---|
| 2,539,521 | Owens | Jan. 30, 1951 |
| 2,623,750 | Masterson | Dec. 30, 1952 |
| 2,821,576 | Gaubert | Jan. 28, 1958 |
| 2,862,715 | MacDonald | Dec. 2, 1958 |
| 2,964,593 | Kleve | Dec. 13, 1960 |
| 3,036,786 | Mammel | May 29, 1962 |

UNITED STATES PATENT OFFICE
CERTIFICATE OF CORRECTION

Patent No. 3,127,178                          March 31, 1964

Fred H. Osborne et al.

It is hereby certified that error appears in the above numbered patent requiring correction and that the said Letters Patent should read as corrected below.

Column 3, line 39, for "taps" read -- tape --; column 4, line 11, for "188" read -- 88 --; column 7, line 39, for "propect" read -- project --; column 13, line 39, for "positions" read -- position --; column 14, line 57, strike out "stationary" and insert the same before "tape" in line 56, same column 14; column 15, line 6, strike out "stationary" and insert the same before "tape" in line 5, same column 15.

Signed and sealed this 15th day of September 1964.

(SEAL)
Attest:

ERNEST W. SWIDER
Attesting Officer

EDWARD J. BRENNER
Commissioner of Patents